(12) United States Patent
McCormick et al.

(10) Patent No.: US 10,319,025 B2
(45) Date of Patent: Jun. 11, 2019

(54) EXECUTING TERMS OF PHYSICAL TRADE DOCUMENTS

(71) Applicant: Bank of America Corporation, Charlotte, NC (US)

(72) Inventors: Ann McCormick, Portland, ME (US); Gary Ford, Charlotte, NC (US); Mark Zanzot, Charlotte, NC (US); Peter Tholl, Albany, NY (US); Robin Tooker, Charlotte, NC (US); Steven Dommes, Scranton, PA (US); Timothy Lukavsky, Charlotte, NC (US); Walter McKay, Albany, NY (US)

(73) Assignee: Bank of America Corporation, Charlotte, NC (US)

( * ) Notice: Subject to any disclaimer, the term of this patent is extended or adjusted under 35 U.S.C. 154(b) by 675 days.

(21) Appl. No.: 14/950,827

(22) Filed: Nov. 24, 2015

(65) Prior Publication Data

US 2017/0148093 A1    May 25, 2017

(51) Int. Cl.
| | | |
|---|---|---|
| *G06Q 30/00* | (2012.01) | |
| *G06Q 30/06* | (2012.01) | |
| G06Q 40/04 | (2012.01) | |
| G06Q 10/08 | (2012.01) | |
| G06Q 40/02 | (2012.01) | |

(52) U.S. Cl.
CPC ......... *G06Q 30/0633* (2013.01); *G06Q 10/08* (2013.01); *G06Q 40/02* (2013.01); *G06Q 40/04* (2013.01)

(58) Field of Classification Search
CPC ............... G06Q 30/0633; G06Q 10/08; G06F 17/30011; G06F 17/30303

USPC ................. 705/26.8, 313; 707/687, E17.005
See application file for complete search history.

(56) References Cited

U.S. PATENT DOCUMENTS

| | | | | |
|---|---|---|---|---|
| 5,258,855 | A * | 11/1993 | Lech | .................... G06K 9/2054 358/448 |
| 5,717,989 | A | 2/1998 | Tozzoli et al. | |
| 7,003,494 | B2 * | 2/2006 | Beach | .................... G06Q 20/10 705/34 |
| 7,213,744 | B2 | 5/2007 | Michelsen et al. | |

(Continued)

OTHER PUBLICATIONS 2015-25617C, Apr. 2015, Derwent, Taparia et al.*

(Continued)

*Primary Examiner* — Yogesh C Garg
(74) *Attorney, Agent, or Firm* — Michael A. Springs

(57) ABSTRACT

A system for executing terms of physical trade documents includes a document intake machine comprising a document scanner and a data extractor. The document intake machine receives a physical trade document from an entity. The document scanner may scan the physical trade document to create an electronic file of the physical trade document. The data extractor may identify trade terms from the electronic file. A trade executing machine receives the trade terms from the document intake machine and compare the trade terms to a trade condition, wherein the trade condition is identified from a document related to the physical trade document. If the trade terms match the trade condition, the trade executing machine may process the physical trade document according to the trade terms and communicate a notification message to the entity indicating that the physical trade document was processed according to the trade terms.

9 Claims, 5 Drawing Sheets

(56) References Cited

U.S. PATENT DOCUMENTS

| | | | |
|---|---|---|---|
| 7,567,912 B2 | 7/2009 | Viarengo et al. | |
| 7,689,482 B2 | 3/2010 | Lam et al. | |
| 7,822,679 B1 | 10/2010 | Vaux et al. | |
| 7,840,455 B1 | 11/2010 | Venkatasubramanian et al. | |
| 8,050,975 B2 | 11/2011 | Jetter et al. | |
| 8,078,533 B1 | 12/2011 | Martin et al. | |
| 8,280,830 B2 | 10/2012 | Kennedy | |
| 8,442,844 B1* | 5/2013 | Trandal | G06Q 30/012 705/35 |
| 8,498,935 B2 | 7/2013 | Leavitt et al. | |
| 8,566,231 B2 | 10/2013 | Reid et al. | |
| 8,600,789 B1 | 12/2013 | Frew et al. | |
| 8,793,191 B2 | 7/2014 | Abernethy et al. | |
| 8,838,474 B2 | 9/2014 | Macy et al. | |
| 9,286,283 B1* | 3/2016 | Wilczek | G06F 17/243 |
| 2003/0191710 A1* | 10/2003 | Green | G06Q 20/102 705/40 |
| 2008/0065655 A1* | 3/2008 | Chakravarthy | G06F 16/38 |
| 2011/0019020 A1* | 1/2011 | King | G06K 9/00442 348/222.1 |
| 2012/0102002 A1* | 4/2012 | Sathyanarayana | G06F 17/30303 707/687 |
| 2012/0166319 A1* | 6/2012 | Deledda | G06Q 10/103 705/30 |
| 2013/0251211 A1 | 9/2013 | Palm et al. | |
| 2014/0012742 A1* | 1/2014 | Hanson | G06Q 20/14 705/40 |
| 2017/0315965 A1* | 11/2017 | Pirvu | G06F 17/2264 |

OTHER PUBLICATIONS

Ann McCormick et al., U.S. Appl. No. 14/950,764, Preventing Restricted Trades Using Physical Documents, filed Nov. 24, 2015.

Ann McCormick et al., U.S. Appl. No. 14/950,973, Executing Shipments Based on Physical Trade Documents, filed Nov. 24, 2015.

Ann McCormick et al., U.S. Appl. No. 14/950,500, Transforming Unstructured Documents, filed Nov. 24, 2015.

Ann McCormick et al., U.S. Appl. No. 14/950,376, Enhancing Communications Based on Physical Trade Documents, filed Nov. 24, 2015.

* cited by examiner

202A — Purchase Order Form

204A — Company A    LOGO

206A — Date: MM/DD/YY

208A — PO: 0000XYZ123

210A — Seller: Company XYZ    Buyer: Company A
        Address                Address
        Phone                  Phone

| Shipping Method | Shipping Date | Terms |
|---|---|---|
|  |  |  |
|  |  |  |

214A

216 — Page 1 of 3

| 5 | Widget B | 4 | 10.50 |
|---|---|---|---|
| 6 | Widget C | 3 | 11.20 |

Page 2 of 3

Signature          Total: _____

200A

Page 3 of 3

| Company B<br>LOGO<br>Trademark® | | Purchase Order<br>Date: Month DD, YYYY<br>P.O.#: ABCD1234 | } 202B<br>} 206B<br>} 208B |
|---|---|---|---|

204B

| Vender<br>Company XYZ<br>Address<br>Phone<br>Fax<br>Email | Ship To:<br>Company B<br>Address #2<br>Phone<br>Fax<br>Email |
|---|---|

210B

214B

| Qty | Desc. | Quantity | Unit Price | Total |
|---|---|---|---|---|
| 1 | | | | |
| 2 | | | | |
| 3 | | | | |

} 218

Total: _____

Signature

EXECUTING TERMS OF PHYSICAL TRADE DOCUMENTS

TECHNICAL FIELD

The present invention relates generally to the field of logistics and, more specifically, to executing terms of physical trade documents.

BACKGROUND

An enterprise may receive and process thousands of physical documents from a number of different entities, including vendors, shippers, sellers, and lenders. The documents may include information regarding the purchase, transport, and delivery of goods and services. Each document may include relevant information such as invoice and purchase order numbers, description of goods and services, transportation and customs routing information, and company identification. Each entity may use a unique set of documents to convey the information. Enterprises spend significant resources processing and identifying key information from documents.

SUMMARY

In accordance with the present disclosure, disadvantages and problems associated with executing terms of physical trade documents may be reduced or eliminated.

In one embodiment, a system for executing terms of physical trade documents includes a document intake machine comprising a document scanner and a data extractor. The document intake machine receives a physical trade document from an entity. The document scanner may scan the physical trade document to create an electronic file of the physical trade document. The data extractor may identify trade terms from the electronic file. A trade executing machine receives the trade terms from the document intake machine and compare the trade terms to a trade condition, wherein the trade condition is identified from a document related to the physical trade document. If the trade terms match the trade condition, the trade executing machine may process the physical trade document according to the trade terms and communicate a notification message to the entity indicating that the physical trade document was processed according to the trade terms.

In another embodiment, a method for executing terms of physical trade documents includes receiving a physical trade document from an entity, wherein the physical trade document is associated with a purchase of goods. Scanning the physical trade document to create electronic file of the physical trade document. Identifying trade terms from the electronic file, wherein trade terms include one or more of a quantity of the goods, a unit price of the goods, and a total price of the goods. The method may then include comparing the trade terms to a trade condition, wherein the trade condition is identified from a document related to the physical trade document. If the trade terms match the trade condition, the method may include processing the physical trade document according to the trade terms and communicating a notification message to the entity indicating that the physical trade document was processed according to the trade terms.

Certain embodiments of the present disclosure may provide one or more technical advantages. One advantage of the present disclosure overcomes problems uniquely faced by computer networks processing large batches of heterogeneous documents, by identifying the location of key information in the documents, calculating the location of the key information, and applying the learned location information to subsequent documents of the same format. Another advantage of the present disclosure may provide for the faster processing and recognition of documents by discerning between different document lengths within a batch of documents without the use of manual separators. Yet another advantage of the present disclosure increases the accuracy of identifying improper information and preventing incorrect shipments and/or payments of goods and services. Other technical advantages will be readily apparent to one skilled in the art from the following figures, descriptions, and claims. Moreover, while specific advantages have been enumerated above, various embodiments may include all, some, or none of the above advantages.

BRIEF DESCRIPTION OF THE DRAWINGS

For a more complete understanding of the present invention and its features and advantages, reference is now made to the following description, taken in conjunction with the accompanying drawings, in which:

FIGS. 2A and 2B illustrate example trade documents for processing by a trade executing machine according to an embodiment of the present disclosure;

DETAILED DESCRIPTION OF THE DRAWINGS

Figure 1:
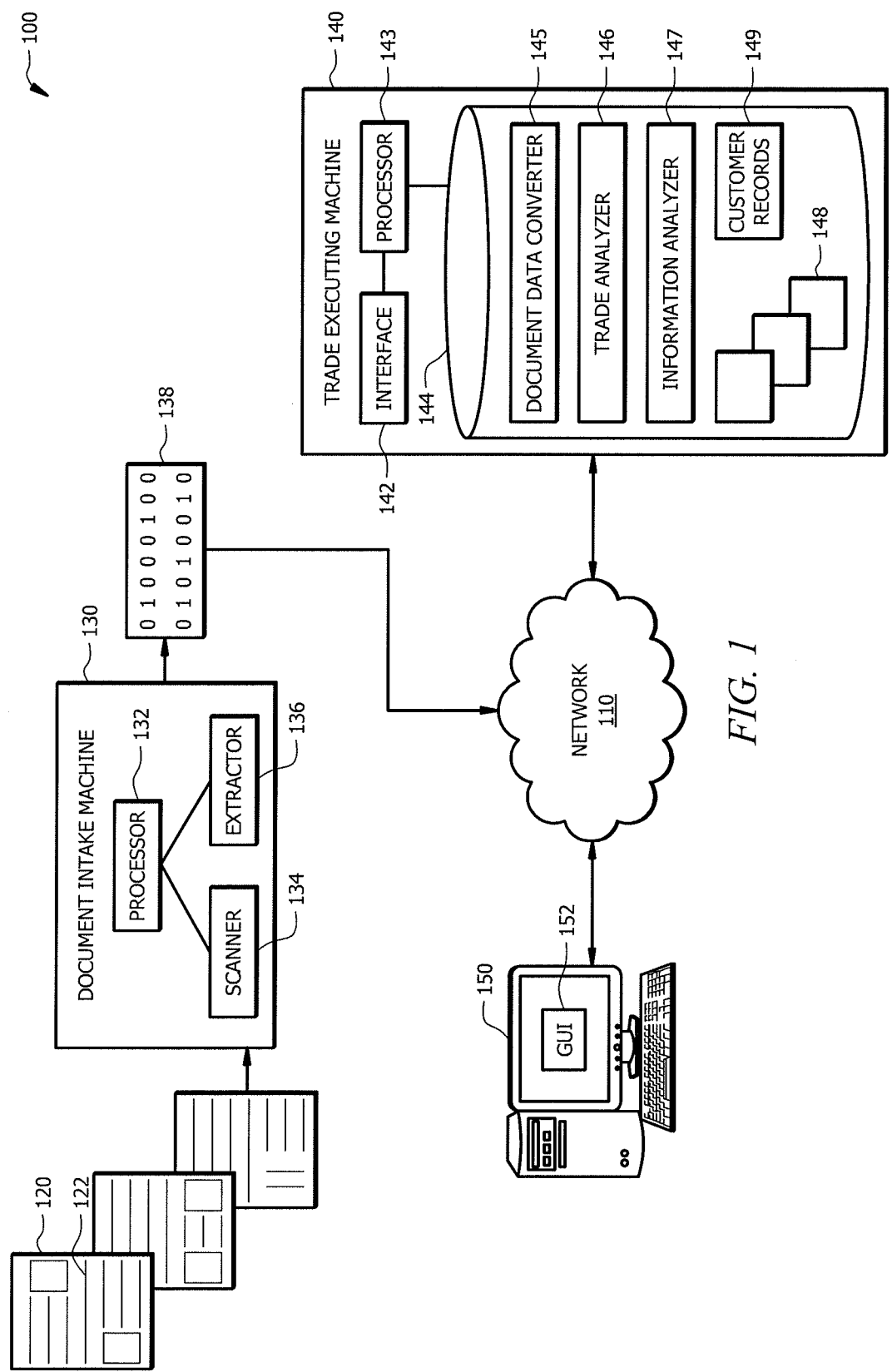
FIG. 1 is a diagram illustrating an example system for converting and processing structured and unstructured documents.

Embodiments of the present disclosure and its advantages are best understood by referring to FIGS. 1-4, like numerals being used for like and corresponding parts of the various drawings.

An enterprise may receive and process thousands of physical documents from a number of different entities, including suppliers, shippers, sellers, and document negotiators (e.g., lenders). The documents may include information regarding the purchase, transport, and delivery of goods and services. Each document may include relevant information such as invoice and purchase order numbers, description of goods and services, transportation and customs routing information, and company identification. Each entity may use a unique set of documents to convey the information. Enterprises spend significant resources processing and identifying key information from documents.

The embodiments described herein overcome a number of technical problems that are present in current networked systems that provide trade logistics. For example, current systems are unable to efficiently handle and process varying document types. These systems are deficient at handling new or "unstructured" documents and identifying key information from the documents.

It is therefore advantageous to provide a system and method for identifying and discerning between a variety of document types and formats to evaluate the information included in each document. For example, an enterprise may contract or otherwise interact with a number of entities, such as suppliers, sellers, transporters, document negotiators (lenders), government organizations, or any other suitable entity involved in the trade of goods and services. A number of documents exchanged in physical, hard-copy format, provide the critical information needed to process the goods and services. These documents may include purchase orders, invoice orders, bills of lading, transport documents, and letters of credit.

A number of complications hinder current systems from efficiently extracting and processing the key information from each physical document. For example, each entity may utilize their own set documents to facilitate a transaction. Thus, an enterprise may encounter a number of disparate document formats when transacting with multiple entities. When the enterprise first encounters a new, "unstructured" document format, the system processing the documents may have trouble identifying and producing the important data from each document, thereby preventing the enterprise from making key decisions regarding the purchase, transport, and delivery of goods. Furthermore, current systems have a limited ability to determine when a first document ends and a second document begins.

To overcome these technical issues, embodiments of the present disclosure utilize a trade executing machine to identify structured and unstructured documents and calculate the location of key information in each document. The trade executing machine may develop and refine a template for each type of processed, physical document and associate the document with a particular entity. This process may allow the trade executing machine to "learn" where critical information is located in each document.

Once the trade executing machine identifies the document type and the entity associated with the document, the trade executing machine may analyze the critical information in the document to make informed decisions regarding the processing, shipping, and acceptance of goods and services.

For example, when the enterprise is scheduled to receive a shipment of goods from a supplier, the enterprise may receive a transport document (e.g., a bill of lading, customs documents, etc.). The trade executing machine may identify key product information from the transport document and compare the product information to a related purchase order previously sent to the supplier. The trade executing machine may determine whether data fields such as the description of goods or shipped quantity of goods match with the description or requested quantity of goods from the purchase order. If the product information matches (or is within a tolerance prescribed by the enterprise), then the trade executing machine may indicate to the responsible logistics personnel that the shipment should be accepted. If the product information does not match up, the trade executing machine may indicate that the shipment should be rejected or deny payment of the related invoice. As described in greater detail below, the trade executing machine may perform a number of actions based on the identification and extraction of key information from structured and unstructured documents.

Using a trade executing machine to process and evaluate structured and unstructured documents provides several technical advantages not realized by current networks. For example, one advantage of the present disclosure overcomes problems uniquely faced by computer networks processing large batches of heterogeneous documents, by identifying the location of key information in the documents, calculating the location of the key information, and applying the learned location information to subsequent documents of the same format. Another advantage of the present disclosure may provide for the faster processing and recognition of documents by discerning between different document lengths within a batch of documents without the use of manual separators. Yet another advantage of the present disclosure increases the accuracy of identifying improper information and preventing incorrect shipments and/or payments of goods and services. FIGS. 1-4 provide additional details of a system and method for processing and evaluating structured and unstructured documents.

FIG. 1 illustrates an example system 100 for converting and processing structured and unstructured documents. System 100 includes network 110 that facilitates communication between document intake machine 130, trade executing machine 140, and workstation 150. Components of system 100 may be internal to an enterprise. An enterprise may be an individual, business, company, or other organization. An enterprise may include one or more lines of business, subsidiaries, or parent organizations and may be geographically dispersed.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

System 100 may receive and process a plurality of trade documents 120 (collectively trade documents 120 or individually trade document 120). The term trade may refer to any exchange, transaction, assignment, consignment, purchase, transport, shipment, sale, or other transfer of goods and/or services. Trade documents 120 represent any suitable documents that facilitate the buying, selling, transferring, assignment, transporting, shipping, consigning, and trading of goods and services. For example, trade documents 120 may represent purchase orders, invoice statements, letters of credit, bills of lading, transport documents, payment documents, receipts, or any other document that may be exchanged between suppliers, sellers, buyers, financial institutions, and third parties.

Trade documents 120 may include trade information 122. Depending on the type of trade document 120, trade information 122 may include any suitable trade tennis that describe and facilitate the buying, selling, transferring, assigning, transporting, shipping, consigning, and/or trading of goods and services. For example, trade information 122 may include entity identification information such as the name, address, logo, trademark, or any other identifying information associated with an entity. Trade information 122 may also include document specific information. For example, invoices and purchase orders may include a purchase/invoice number, a shipment date, tracking number, terms, product/service description, product quantities, unit pricing, costs, shipping information (e.g., delivery address and supplier name/address), and purchasing entity. A transport document may include information such as a carrier name, related purchase order number, supplier/shipper, transport document number, shipper/carrier signatures, customs clearance indicia (e.g., stamps, signatures, etc.), product identifiers (quantity, weight, etc.) and insurance information. In some embodiments, trade documents 120 may include letters of credit. A letter of credit or an open account may include trade information 122 such as an issuing financial institution, a credit amount, the entity receiving the credit, and an expiration of the letter of credit.

In some embodiments, system 100 receives a number of heterogeneous, physical (i.e., tangible, hard copy) trade documents 120 from a one or more entities. For example, system 100 may receive a batch of 100 trade documents 120. Trade documents 120 may include a number of different invoices, purchase orders, and transport documents from entities such as suppliers, transporters, and buyers. Each supplier may utilize their own unique format for a specific trade document 120. As an example, supplier A may utilize invoice format #1, while supplier B may utilize invoice format #2. The length and location of relevant trade information 122 may vary between each trade document 120. To distinguish between trade documents 120, in certain embodiments, each trade document 120 may be accompanied by a cover sheet or a physical separator. However, in certain embodiments, trade executing machine 140 may distinguish each trade document 120 without the use of separators and coversheets as trade documents 120 are processed.

In the illustrated embodiment, system 100 receives trade documents 120 at document intake machine 130. In general, document intake machine 130 is responsible for scanning trade documents 120 and extracting trade information 122 from each document. More specifically, document intake machine 130 represents any suitable components that facilitate the intake of physical trade documents 120 and the conversion of trade documents 120 into electronic files 138 (collectively electronic files 138 or individually electronic file 138). Although illustrated as a plurality of trade documents 120, document intake machine 130 may process a single trade document 120.

Document intake machine 130 may include processor 132, document scanner 134, and data extractor 136. Processor 132 communicatively couples to document scanner 28, and data extractor 136. Processor 132 includes any hardware and/or software that operates to control and process information. For example, processor 132 may execute software to control the operation of document intake machine 130. Processor 132 may be a programmable logic device, a microcontroller, a microprocessor, any suitable processing device, or any suitable combination of the preceding.

Document scanner 134 represents any suitable component that facilitates the optical scanning and image capture of trade documents 120. The resulting electronic file 138 of trade document 120 can be transferred to trade executing machine 140 and stored in memory 144. Electronic file 138 may be of any suitable digital format that includes the digital image of trade documents 120. For example, electronic files 138 may be stored as Bitmap, TIFF, PNG, JPEG, GIF, PDF, or any other suitable digital format. Electronic files 138 may be encoded in any suitable digital format by document intake machine 130, processor 132, document scanner 134, or any other component of system 100 capable of encoding raw image data into a suitable digital format. For example, in some embodiments, document intake machine 130 may facilitate the creation of a digital XML image file associated with each scanned in trade document 120.

In some embodiments, data extractor 136 may be responsible for detecting trade information 122 in trade documents 120. Data extractor 136 represents any suitable component that facilitates the translation of trade documents 120 into an electronic text format. For example, data extractor 136 may be capable of using hardware and/or software to conduct optical character recognition (OCR) to detect trade information 122 of trade documents 120. The detected trade information 122 of trade documents 120 can be converted into electronic file 138 and be transferred to trade executing machine 140 for further analysis. The digital format of electronic files 138 may be a text file, a Microsoft Word document, a PDF file, an entry into a table in a database, and XML file or any other suitable digital format for storing text. Document intake machine 130 may communicate or be integrated with trade executing machine 140 and/or workstation 150.

Workstation 150 enables one or more users to monitor, administer, or otherwise interact with document intake machine 130 and/or trade executing machine 140. Workstation 150 may include one or more laptops, personal computers, monitors, display devices, handheld devices, smartphones, servers, user input devices, or other suitable components for enabling user input. Workstation 150 may itself include trade executing machine 140 and document intake machine 130. Workstation 150 may be internal to an enterprise or may remotely access an enterprise. Although the illustrated embodiment shows workstation 150 as a computer, workstation 150 may be any suitable device, such as a mobile device, that allows a user to interact and monitor document intake machine 130 and trade executing machine 140. In the illustrated embodiment, workstation 150 includes a graphical user interface (GUI) 152.

GUI 152 represents any suitable graphical arrangement of information presented to one or more users, network administrators, logistics personnel, and/or suppliers. For example, GUI 152 may display information received from document intake machine 130, trade executing machine 140, or any other suitable medium used to convey information, such as a website. GUI 152 is generally operable to tailor and filter data entered by and presented to a user. GUI 152 may provide a user with an efficient and user-friendly presentation of information. GUI 152 may comprise a plurality of displays having interactive fields, pull-down lists, and buttons operated by users. GUI 152 may include multiple levels of abstraction including groupings and boundaries. It should be understood that the term in GUI 152 may be used in the singular or in the plural to describe one or more GUIs 152 in each of the displays of workstations 150.

In the illustrated embodiment, once trade documents 120 are converted into electronic files 138, document intake machine 130 may transmit the electronic files 138 to trade executing machine 140 using network 110.

Trade executing machine 140 represents any suitable components that facilitate the identification and processing of structured and unstructured documents 120. Trade executing machine 140 may include a network server, remote server, mainframe, host computer, workstation, web server, personal computer, file server, or any other suitable device operable to communicate with other devices and process data. In some embodiments, trade executing machine 140 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of trade executing machine 140 may be performed by processor 132 of document intake machine 130 or by one or more servers communicatively coupled to document intake machine 130. In some embodiments, workstation 150 and document intake machine 130 may be integrated with trade executing machine 140 or they may operate as part of the same device or devices.

In the illustrated embodiment, trade executing machine 140 includes an interface 142, a processor 143, and a memory 144, which comprises a document data converter program 145, an trade analyzer program 146, and an information analyzer program 147. Furthermore, memory 144 may also include stored documents 148 and customer records 149.

Interface 142 represents any suitable device operable to receive information from network 110, transmit information through network 110, perform suitable processing of the information, communicate to other devices, or any combination thereof. For example, interface 142 may receive electronic files 138 from document intake machine 130 and store the electronic files 138 as stored documents 148. Interface 142 may also facilitate communications between workstation 150 and trade executing machine 140. As explained below, trade executing machine 140 may utilize information analyzer program 147 to detect inconsistencies between related trade documents 120. For example, the quantity of goods from a purchase order sent by a buyer may not match with the related quantity description from the supplier's subsequent invoice. Trade executing machine 140 may corroborate the quantity information from the documents to see how many goods were actually shipped from the supplier to the buyer. Using this information, trade executing machine 140 may use interface 142 to send a notice message indicating any discrepancies to the supplier, buyer, transporter and/or financial institution providing credit for the sale.

Interface 142 represents any port or connection, real or virtual, including any suitable hardware and/or software, including protocol conversion and data processing capabilities, to communicate through a LAN, WAN, or other communication system that allows trade executing machine 140 to exchange information with network 110, workstation 150, document intake machine 130, or any other components of system 100.

Processor 143 communicatively couples interface 142 and memory 144 and controls the operation of trade executing machine 140. Processor 143 includes any hardware and software that operates to control and process information. Processor 143 may execute computer-executable program instructions stored in memory 144. Processor 143 may include, but is not limited to, a microprocessor, an application specific integrated circuit (ASIC), and or state machines.

Memory 144 stores, either permanently or temporarily, data, operational software, other information for processor 143, other components of trade executing machine 140, or other components of system 100. Memory 144 includes any one or a combination of volatile or non-volatile local or remote devices suitable for storing information. For example, memory 144 may include RAM, ROM, flash memory, magnetic storage devices, optical storage devices, network storage devices, cloud storage devices, solid state devices, or any other suitable information storage device or a combination of these devices.

Memory 144 may store information in one or more databases, file systems, tree structures, any other suitable storage system, or any combination thereof. Furthermore, different information stored in memory 144 may use any of these storage systems. Moreover, any information stored in memory 144 may be encrypted or unencrypted, compressed or uncompressed, and static or editable. Although illustrated as including particular modules, memory 144 may include any suitable information for use in the operation of trade executing machine 140.

In the illustrated embodiment, memory 144 includes document data converter program 145, trade analyzer program 146, and information analyzer program 147. After receiving electronic files 138, processor 143 may implement document data converter program 145, trade analyzer program 146, and/or information analyzer program 147 to determine what format trade document 120 represents, what trade information 122 is included in trade document 120, whether trade document 120 is associated with any other trade documents 120 for a given transaction, and what subsequent actions should be taken based on trade information 122. The following sections describe the processing that trade executing machine 140 may perform upon receiving electronic files 138.

Identifying and Transforming Unstructured Trade Documents

In some embodiments, trade executing machine 140 may not recognize a specific trade document 120 or be familiar with certain identification information (e.g., logos, trademarks, trade names). To facilitate the identification of trade information 122, trade executing machine 140 may utilize document data converter program 145 to process "unstructured" trade documents 120.

In some embodiments, trade executing machine 140 may be unable to identify the format or length of trade document 120 when trade executing machine 140 receives electronic files 138. To identify and process the "unstructured" trade document 120, trade executing machine 140 may utilize document data converter program 145 to identify and process the trade information 122 included in the unstructured electronic file 138.

To process an unstructured trade document 120, document data converter program 145 may employ one or more algorithms to identify trade information 122, determine the location of trade information 122 in trade document 120, and determine the length of trade document 120. In certain embodiments, the applied algorithms may include using locational and contextual awareness to search for the trade information 122 in locations where the terms are typically located.

Document data converter program 145 may apply a locational awareness algorithm to electronic file 138 to identify the location of trade information 122 in the physical trade document 120 by assigning a coordinate grid to the electronic file 138. Depending on the width and height of trade document 120 and the granularity desired by trade executing machine 140, the coordinate grid may span any suitable range. For example, system 100 may process an 8.5"×11" trade document 120 using a granularity of 72 points per inch. Upon receiving electronic file 138 representing trade document 120, document data converter program 145 may designate the bottom-left corner of trade document 120 as the x-y origin (0, 0), while the top-right corner may represent the x-y coordinates (612, 792). In this manner, each inch of an 8.5"×11" trade document 120 corresponds to a granularity of 72 points.

Document data converter program 145 may select the origin at any location and use any suitable coordinate system (i.e., document data converter program 145 may utilize polar coordinates when trade document 120 is circular). Similarly, document data converter program 145 may increase or decrease the number of points per inch used in the coordinate system based on the desired granularity.

In some embodiments, document data converter program 145 may break each trade document 120 into grids with defined lengths and widths. For example, if trade document 120 is on an 8.5"×11" piece of paper, document data converter program 145 may divide trade document 120 into twenty sections (e.g., 5 rows and 4 columns), with each section being 2.125" in width and 2.2" in height. For more or less granularity, trade executing machine 140 may apply additional or fewer rows and/or columns to each trade document 120.

In some embodiments, the type of trade document 120 may be indicated near the top of the document or in a header field. Document data converter program 145 may search a specific coordinate range or grid area of trade document for keywords that may indicate the type of document. For example, trade executing machine 140 may apply a coordinate system to each trade document 120 scanned by document intake machine 130, with the origin being at the bottom left of each trade document 120 and the top-right coordinate representing (612, 792).

When attempting to identify the type of trade document 120 being processed, document data converter program 145 may search areas of trade document 120 that typically contain the key trade information 122. For instance, document data converter program 145 may scan the top 20% of trade document 120 (i.e., the area from y-coordinate 633-792) for key words such as "Purchase Order," "Invoice," and "Transport Document." Upon finding a keyword, document data converter program 145 may "learn" the specific location, width, and height of the keyword for the specific trade document 120.

In a similar manner, document data converter program 145 may scan trade document 120 for additional trade information 122, such as relevant field names. Document data converter program 145 may scan for the date, purchase/invoice number, company name, company logo, description of goods, quantity of goods, price of goods, signatures, document identifiers, page number identifiers, or any other suitable trade information 122 associated with a trade document.

Document data converter program 145 may also look for known locational and/or contextual patterns in trade documents 120 to locate key trade information 122. For example, certain industries or entities may use a specific data format for trade information 122. For example, a supplier may use leading zeros in their purchase order numbers (e.g., 000ABC123). By searching for trade information 122 for numbers having leading zeros, document data converter program 145 may potentially identify PO numbers and/or invoice numbers.

Similarly, document data converter program 145 may recognize that signature blocks typically indicate the end of a document. In some embodiments, upon detecting a word like "signature," document data converter program 145 may mark the page as the last page of the current trade document 120 in the batch of trade documents 120. In some embodiments, document data converter program 145 may search for trade information 122 indicating page number such as "1 of X," to determine how many pages are included in a trade document 120. As described above, document data converter program 145 may search specific areas of trade document 120 that typically contain the page indicator such as a header or footer. In this manner, document data converter may use information and location patterns to ascertain relevant trade information 122.

Once document data converter program 145 has identified the locations and format of trade document 120, in some embodiments, document data converter program 145 may create a template file of the unstructured trade document 120 using the patterns identified using the locational and/or contextual algorithms. The patterns may include information like the locations (i.e., coordinate and/or grid locations) of key trade information 122, the length (i.e., number of pages) of each trade document, and the entity associated with the trade document 120. The template file may then be associated with the electronic customer number for the given type of trade document 120 and used in future analysis when trade executing machine 140 encounters the trade document 120 again. In this manner, trade executing machine 140 may learn the types of documents that are processed by system 100 and efficiently and accurately extract data from each trade document 120 including new or unstructured trade documents 120.

In some embodiments, trade executing machine 140 may be "trained" to identify unstructured trade documents 120. An enterprise may know that it will begin receiving trade documents 120 from a new supplier. Prior to receiving the new trade documents 120, workstation 150 may provide trade executing machine 140 with mock templates of various trade document 120 formats used by the supplier. Using document data converter program 145, trade executing machine 140 may preemptively begin identifying the location of key trade information 122 in each type of trade document 120 used by the supplier.

For example, workstation 150 and/or document intake machine 130 may provide trade executing machine 140 with an invoice template utilized by a new supplier. Trade executing machine 140 may receive the electronic file 138 of the invoice template and use trade analyzer program 146 to identify that the invoice is associated with a new supplier, for example by checking the supplier name in customer records 149. Upon determining that the invoice is associated with a new supplier, conversion model 140 may use document data converter program 145 to identify the structure of the invoice trade document 120 to identify the location of the associated trade information 122.

As explained above, document data converter program 145 may perform a document layout analysis of trade document 120 to determine the structure of the invoice used by the new supplier. For instance, document data converter program 145 may break the supplier's invoice into a number of zones. Document data converter program 145 may then scan the invoice for field names associated with invoices, such as "Invoice," "Supplier," "Address," "Sold To:," "Subtotal," "Total," "description," "quantity," "PO number," "Invoice number," and "Shipping Date." Document data converter program 145 may then identify where each key piece of trade information 122 is located in the invoice (i.e., the particular zone/line/column/grid the trade information 122 is located). In this manner, trade executing machine 140 may preemptively create a template of the supplier's invoice and store the template information as stored document 148. When trade executing machine 140 later encounters the supplier's invoice in a future trade document 120 batch, trade executing machine 140 may then recall the template in stored documents 148 and search the known locations for the relevant trade information 122. In a similar manner, trade executing machine 140 may preemptively learn other trade documents 120 that the supplier may use.

In some embodiments, an entity may print a document code on their forms to indicate the type or format of trade document 120. As an example, an entity may print INV-100 on their invoices to indicate a specific format and version of their invoices. If the invoice is updated, the entity may print INV-101 to acknowledge the revised invoice format. Document data converter program 145 may identify and recognize trade documents 120 for known document codes, and upon finding a document code, updating the document template in stored documents 148.

Once document data converter program 145 identifies the structure and format of trade document 120, trade executing machine 140 may utilize trade analyzer program 146 and information analyzer program 147 to analyze and process trade information 122 associated with trade documents 120.

Enhancing Trade Logistics Using Document Identification and Tracking

Upon receiving electronic files 138, trade executing machine 140 may utilize document data converter program 145 and trade analyzer program 146 to process trade documents 120, including identifying the type of trade document 120 (e.g., purchase order, invoice, transport document), the entity associated with the document (e.g., the supplier, buyer, transporter, financial institution), and related trade information 122.

In some embodiments, trade executing machine 140 receives electronic files 138 and uses trade analyzer program 146 to determine which entities are associated with each trade document 120. Trade analyzer program 146 may scan the trade information 122 extracted by document intake machine 130 an identify key entity information such as the name and address of the entity. As illustrated in FIG. 2, an entity may also include its unique logos and/or trademarks in their trade documents 120, providing additional information for trade analyzer program 146 to scan when identifying which entities are associated with the trade document 120.

Trade analyzer program 146 may also identify the entity's relationship to trade document 120. For example, trade analyzer program 146 may attempt to identify the type of trade document 120 scanned. By searching for keywords such as "Invoice" and "Purchase Order," trade analyzer 145 can predict the type of trade document 120 being processed. Once trade analyzer program 146 knows the type of trade document 120 being processed, trade analyzer program 146 may pull relevant trade information 122 from trade document 120. For example, if trade document 120 is a purchase order, trade analyzer program 146 may know to search for key terms/field names like "supplier," "purchaser," "ship to," "date," "PO," "address," "goods," "quantity," "unit price," "description," and "quantity." Trade analyzer program 146 may also search for corollaries of each word. For instance, while searching for the term "PO," document data converter program 145 may also search for "P.O.," "PO #," "P.O. #," "purchase order," "purchase order number," "purchase order #," or any other suitable corollary.

In certain embodiments, trade analyzer program 146 may assign and/or update a customer record 149 with each identified entity related to trade documents 120. Once trade analyzer program 146 identifies the trade document 120 and related entities, trade analyzer program 146 may check the identified entities against a database of entities stored as customer records 149 in memory 144. For example, entity data analyze 146 may identify that trade document 120 is a purchase order and that "company A" is listed as the supplier and "company B" is the buyer. Trade analyzer program 146 may search customer records 149 for company A and company B. If a company does not have an electronic customer number, then trade analyzer program 146 may assign the company a unique number. If the company already has a unique electronic customer number, then trade analyzer program 146 may use the existing number. Once trade analyzer program 146 identifies the electronic customer numbers of company A and company B, trade analyzer program 146 may associate the trade document 120 with each customer number.

In some embodiments, once the entities, trade document 120 type, and/or electronic customer numbers are known, trade analyzer program 146 may take additional steps to streamline the classification and organization of trade documents 120. Using information pulled from trade document 120, trade analyzer program 146 may determine whether trade document 120 has already been processed and indexed in stored documents 148. For example, trade analyzer program 146 may identify that trade document 120 is a purchase order sent from company B on date MM/DD/YYYY. Using company B's electronic customer number, trade analyzer program 146 may search for related purchase orders, listing company B as the purchaser on the same date. If trade analyzer program 146 identifies duplicate trade documents 120, trade analyzer program 146 may simply delete the duplicate trade document 120 in memory 144. In some embodiments, trade analyzer program 146 may communicate the redundancy to a user (e.g., logistics personnel) at workstation 150 through GUI 152 to notify the user of the redundancy. Additionally or alternatively, trade analyzer program 146 may print hardcopies of the redundant trade documents (i.e., the newly processed trade document 120 and the previously stored trade document 120) for a user at workstation 150 to confirm.

Trade analyzer program 146 may also organize stored documents 148 using the trade information 122 identified and pulled from each trade document 120. For example, trade analyzer program 146 may classify documents by any relevant category. In some embodiments, trade analyzer program 146 may organize stored documents 148 in a relational database by any suitable criteria. For instance, trade analyzer program 146 may classify stored documents 148 by document type (e.g., purchase order, invoice, bill of lading, transport documents, letter of credit, etc.), entity, entity role (e.g., supplier/seller, purchaser/buyer, shipper, consignor, consignee, etc.), date, and purchase/invoice numbers.

In certain embodiments, trade analyzer program 146 may associate previously identified trade documents 120 stored in memory 144 with the trade document 120 currently being processed. For example, trade analyzer program 146 may identify one or more trade documents 120 associated with a trade. A single trade may involve a purchase order, an invoice, transport documents such as a transport document, financing documents such as letters of credit, and any other suitable documents used to facilitate a trade. In some embodiments, trade analyzer program 146 identifies which trade documents 120 should be associated with the same trade based on cross-reference document information and/or unique identifiers found in each trade document 120. For instance, an invoice and transport document may include a cross-reference to a purchase order by including the purchase order number along with the same or substantially similar description of goods as the purchase order. Similarly, a letter of credit may indicate the entity receiving the credit is the entity providing the purchase order. Trade analyzer program 146 may link these documents together. For instance, trade analyzer program 146 may assign each trade document 120 associated with a trade specific reference number. As explained below, trade analyzer program 146 may then pull each trade document 120 having a specific reference number when determining how to proceed with a trade.

Once document data converter program 145 and/or trade analyzer program 146 identify trade document 120 and extract the relevant trade information 122, trade executing machine 140 may then apply information analyzer program 147 to analyze the trade information 122 to execute decisions related to trade documents 120, such as whether to accept/deny a shipment of goods, pay an invoice, and prevent a shipment or sale of restricted good.

Executing Trade Terms and Conditions

Once document data converter program 145 and/or trade analyzer program 146 have identified and extracted the relevant trade information 122 from a trade document 120, information analyzer program 147 may determine how trade information 122 should be utilized. In some embodiments, information analyzer program 147 may evaluate key trade terms from trade information 122. Information analyzer program 147 may compare trade terms from multiple related trade documents 120 to determine how to process a transaction. In some embodiments, information analyzer program 147 may evaluate trade information 122 from trade document 120 against an enterprise's internal regulations to make informed decisions regarding the purchase, sale, transport, or acceptance of goods and services. Additionally, information analyzer program 147 may evaluate trade information 122 in light of governmental regulations and restrictions to ascertain whether to execute certain purchases, sales, or shipments.

Trade executing machine 140 may utilize information analyzer program 147 to determine when to process certain transactions such as whether to pay an invoice received from a supplier or whether to proceed with a shipment of goods. Trade executing machine 140 may receive electronic file 138 from document intake machine 130 and identify a number of trade terms from trade information 122. To determine how to process a transaction associated with electronic file 138, trade executing machine 140 may evaluate the trade terms against trade conditions from related trade documents 120. If the trade terms match the trade conditions from related trade documents 120, trade executing machine 140 may process trade document 120 according to the trade terms. If the trade terms do not match the trade conditions, trade executing machine 140 may reject processing trade document 120. In some embodiments, trade executing machine 140 may identify the discrepancies between the trade terms and the trade conditions, and communicate a notification message to the entity associated with trade document 120 indicating that trade document 120 was not processed due to the discrepancies between the trade terms and the trade condition.

As an illustrative example, a supplier may supply an enterprise with a shipment of goods in response to the enterprise sending the supplier a purchase order for the goods. After shipping the goods, the supplier may send the enterprise a paper invoice (i.e., a hardcopy of the invoice) for the goods. Upon receiving the invoice, document intake machine 130 may scan the invoice using scanner 134 and extract or OCR the invoice using extractor 136. After converting the paper invoice into electronic file 138, document intake machine 130 may communicate electronic file 138 to trade executing machine 140 for analysis. As described above, trade executing machine 140 may utilize document data converter program 145 and/or trade analyzer program 146 to process and determine the trade information 122 from the invoice.

To determine whether the enterprise should pay the invoice, information analyzer program 147 may identify whether trade terms from the invoice match with trade conditions from the purchase order. For example, the enterprise may have requested 35 widgets from the supplier at a requested cost of $10.00 per widget. The invoice may indicate that only 33 widgets were billed for at a price of $10.50.

Document data converter program 145 may determine whether the invoice complies with the purchase order. If the billed cost of goods from the invoice matches the requested cost of goods from the purchase order, trade executing machine 140 may process the invoice. If the billed cost of goods from the invoice do not match the requested cost of goods from the purchase order, trade executing machine 140 may reject the shipment and not pay the invoice. In some embodiments, trade executing machine 140 may determine that the trade terms match the trade conditions if the terms and conditions are within a predetermined tolerance (e.g., 5%, 10%). Thus, in the above example, although the requested cost of goods differs from the billed cost of goods, trade executing machine 140 may determine that the difference is within a predetermined threshold (e.g., 10%) and process the invoice.

If trade executing machine 140 determines that the invoice should not be paid, because the invoice does not match the purchase order or because the invoice is outside allowed tolerances, trade executing machine 140 may not pay the invoice. In some embodiments, trade executing machine 140 may also transmit the rejected invoice to workstation 150 via interface 142 with a message as to why the invoice was not paid (e.g., "Invoice does not match Purchase Order"). In some embodiments, trade executing machine 140 may print a notice on the invoice such as "rejected" and transmit a hard copy and/or electronic copy of the invoice back to the supplier.

If trade executing machine 140 determines that the invoice should be paid, because the invoice matches the purchase order or because the invoice is within allowed tolerances, in some embodiments, trade executing machine 140 may provide payment approval to the supplier according to the invoice. Additionally or alternatively, trade executing machine 140 may send a notice to workstation 150 identifying the invoice and that the invoice was paid or needs to be paid.

Notices to workstation 150 may be in any suitable format. For example, a notice may be an email including the relevant information. The email may also include an attachment of any relevant documents needed by a user to understand the notice sent by trade executing machine 140, such as the relevant invoices, purchase orders, and/or transport documents. In some embodiments, a notice may be in the form of an SMS message, a fax, an automated telephone message, or any other suitable notification method.

Trade executing machine 140 may also determine whether the payment should proceed based on the trade terms included in a shipment document such as a transport document and/or an insurance certificate. Trade executing machine 140 may receive electronic file 138 from document intake machine 130 and identify a plurality of shipment information from the trade information 122. For example, trade executing machine 140 may capture information such as a shipment address, a description of goods, a quantity of goods, a shipment method, or any other type of shipment information. Trade executing machine 140 may compare the shipment information to one or more related shipment documents to determine whether to process the shipment of goods.

As an illustrative example, a buyer may send a supplier a purchase order for a quantity of goods. The supplier may receive the purchase order, and prepare a shipment based on the requested quantity of goods from the purchase order. The supplier or the supplier's transporter may generate a cargo/packing list for the shipment, detailing the type and quantity of goods shipped to the buyer.

In some embodiments, the supplier may utilize system 100 to convert the purchase order and cargo list into electronic file 138 and analyze the documents using trade executing machine 140 to determine whether to execute the shipment. For example, trade executing machine 140 may identify the requested quantity of goods from the purchase order and the packed number of goods from the cargo list. Trade executing machine 140 may then compare the requested quantity of goods to the packed number of goods. If the requested quantity of goods is equal or within an allowed tolerance to the packed number of goods, the supplier may ship the requested quantity of goods to the buyer. If the requested quantity of goods is greater than the packed number of goods, the supplier may ship the goods and communicate a notification message to the buyer identifying the difference between the requested quantity of goods and the packed number of goods. In certain embodiments, if the purchase order lists a requested shipping method, trade executing machine 140 may indicate that the goods should be shipped to the buyer using the requested shipping method.

In some embodiments, the buyer may be financed by a lending institution. The lender may be responsible for paying suppliers providing goods according to terms of purchase orders or other instruments. The lender may utilize system 100 to determine when payment should be made to the suppliers after terms of a purchase order have been met. Using the above example, the supplier and/or buyer may send a copy of the purchase order to the lender. The lender may receive and process the purchase order using document intake machine 130 and trade executing machine 140. Similarly, the supplier and/or transporter may send a copy of the cargo list to the lender and the lender may receive and process the cargo list. Using trade execution machine 140, if the requested quantity of goods is equal to or within an allowed tolerance to the packed number of goods, trade execution machine 140 may indicate or facilitate paying the suppliers on behalf of the buyer. If the requested quantity of goods and packed quantity of goods do not match or are outside of allowed tolerances, trade executing machine 140 may flag the shipment and/or indicate that the supplier should not be paid. In this manner, system 100 may be utilized by various enterprises to facilitate the shipment of goods.

Although the above examples discussed trade terms such as unit quantities, costs, and shipping decisions, information analyzer program 147 may evaluate any relevant trade terms such as product descriptions, shipping deadlines, and applied taxes. Furthermore, in some embodiments, system 100 may be implemented by an enterprise acting as an interested third party between the suppliers and buyers, such as a financial institution financing an entity. Thus, in a similar manner to the examples described above, a financial institution may also use trade executing machine 140 to evaluate trade documents 120 such as letters of credit. For instance, a purchase order from a buyer may be evaluated against an invoice to confirm compliance with the terms of the invoice and/or to ascertain whether the invoice complies with the terms of a letter of credit.

In addition to evaluating trade information 122 to process trade transactions, information analyzer program 147 determine whether trade documents 120 are part of, or potentially part of, a restricted transaction. Information analyzer program 147 may use relevant trade information 122 such as shipping addresses, company names, and product/good descriptions to determine whether a transaction associated with trade documents 120 is restricted.

For example, information analyzer program 147 may determine whether an entity identified by trade analyzer program 146 is listed as a restricted entity by the Office of Foreign Assets Control (OFAC). Information analyzer program 147 may also determine whether a shipping address or the address of a supplier/buyer is associated with a restricted entity. Similarly, information analyzer program 147 may analyze the product description sections of invoices, purchase orders, and transport documents to ensure that certain products are not being purchased, sold, or shipped in violation of restrictions.

As an example, trade executing machine 140 may receive electronic file 138 representing a purchase order for goods from a buyer located in country X. Information analyzer program 147 may evaluate the name of the buyer, country X, the goods requested, the address of the buyer, and additional information as required by economic sanctions compliance regulation against the rules provided by OFAC and/or other globally required sanctions bodies. Trade executing machine 140 may determine that country X is on OFAC's list of sanctioned countries, which prevents the enterprise from trading with the buyer. Similarly, trade executing machine 140 may identify certain addresses or goods may violate a restriction designated by OFAC.

In certain embodiments, if information analyzer program 147 identifies a trade document 120 associated with a potentially restricted trade, trade executing machine 140 may flag the document for closer analysis. Information analyzer program 147 may flag a trade document 120 for including a phrase or words in a goods description that may violate a trade restriction. For instance, words or phrases that describe arms, ammunition, explosives, and/or restricted entities.

Information analyzer program 147 may maintain a database of the flagged phrases and/or words in stored documents 148 along with an indication (i.e., confidence) of the likelihood that the word and/or phase is actually associated with a restricted trade. If upon further analysis, the flagged trade document 120 is actually associated with a restricted trade, the confidence level of the flagged phrase/word may increase. Similarly, if the trade document 120 is not associated with a restricted trade then trade executing machine 140 may reduce or modify the confidence level associated with the phrase/word.

In some embodiments, upon initially flagging trade document 120 as potentially being involved in a restricted transaction, trade executing machine 140 may notify the entity associated with trade document 120 that trade document 120 is undergoing further analysis. If in response to further analysis, trade document 120 is determined to not be part of a restricted transaction, trade executing machine 140 may communicate a follow up message to the entity indicating that the transaction of goods is not restricted. In this manner, trade executing machine 140 may update entities transacting with the enterprise of any potential delays that may occur during processing of trade document 120.

In some embodiments, information analyzer program 147 may identify multiple phrases and/or words within trade document 120 to determine an overall confidence level. Although a single phrase by itself may not flag trade document 120, multiple phrases within a single document or set of related documents may result in a flagged trade document 120. Similarly, information analyzer program 147 may initially flag trade document 120 for including a trade term that has a high confidence level, but may remove the flag from trade document 120 upon combining the trade term having a high confidence level with other terms in trade document 120. For example, a company name may be associated with a low confidence that the company is on a restricted trade list (e.g., the trade document 120 lists a common company name). However, when combined with the shipping address of the company name, the confidence level may increase over a predetermined threshold, causing information analyzer program 147 to flag the trade document 120. In this manner, trade executing machine 140 may accurately identify trade documents 120 associated with potentially restricted trades.

In some embodiments, information analyzer program 147 may identify terms and phrases across multiple related trade documents 120 that result in a flagged trade transaction. For example, a buyer may purchase a number of products from a supplier by sending the supplier a purchase order. The purchase order by itself may not raise any flags. However the buyer may also send a letter of credit indicating the buyer's ability to pay for the requested goods. The letter of credit may list the name of a financial institution that is on a restricted trade list. Accordingly, trade executing machine 140 may be able to flag the purchase of goods as potentially restricted based on the financing provided by the restricted financial institution.

Upon flagging and determining that trade document 120 is associated with a restricted trade, trade executing machine 140 may take additional steps to prevent the restricted trade. For example, trade executing machine 140 may terminate the underlying trade associated with flagged trade document 120 by cancelling the shipment of goods from the enterprise. In some embodiments, trade executing machine 140 may notify a governmental authority of the trade document 120. Accordingly, an enterprise may use system 100 to prevent participating in trades with sanctioned entities and/or countries.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the disclosure. For example, although trade documents 120 are described as invoices, purchase orders, transport documents, and financial documents, trade documents 120 may further include information from product labels, packaging from received shipments, or non-text based data. In some embodiments, trade executing machine 140 may be utilized on electronic documents that have not been converted using document intake machine 130. For example, workstation 150 may receive an email with an attachment having a purchase order or invoice. Workstation 150 may communicate the attachment to trade executing machine 140 for processing in a similar manner to the processing done to electronic file 138. Thus, in some embodiments, trade executing machine 140 may receive electronic files 138 from document intake machine 130 and/or workstation 150. Any suitable logic may perform the functions of system 100 and the components within system 100.

To further describe the operation of processing system 100, FIGS. 2A-B illustrate example trade documents 120 for processing by trade executing machine 140. In the illustrated embodiments, first purchase order (PO) format 200A illustrates an example of a PO format used by Company A, while second PO format 200B illustrates an example PO format used by Company B. Each PO format 200 may include similar trade information 122, including entity identification information 204; PO date 206; PO number 208; seller/supplier identifier 210; shipping information 214; and goods information 218. However, the location and style of this information may differ between PO formats 200. Furthermore, one PO format 200 may include trade information 122 that is not present in a different PO format 200, such as document code 220 and a page identifier 216. As discussed in FIG. 1, trade executing machine 140 may process each distinct PO format 200 and learn where key trade information 122 is located in each form, despite the differences in format, length, and information.

Trade document type 202 may designate the type of trade document 120 being processed by system 100. The location and wording of trade document type 202 may vary in location and style between trade documents 120. For example, first PO format 200A lists trade document type 202A as "Purchase Order Form," and locates the title in the upper left hand portion of the document. Second PO format 200b lists trade document type 202B as "Purchase Order," and locates the type information in the upper right hand portion of the document. As described in FIG. 1, trade executing machine 140 may utilize document data converter program 145 to identify the trade document type 202 in each respective PO form and learn the location and format of the forms. In some embodiments, once trade executing machine 140 identifies the type of trade document 120 by the trade document type 202, trade executing machine 140 may search for trade information 122 unique to the trade document type 202.

Entity identification information 204 may identify the entity transmitting trade document 120. Entity identification information 204 may include any suitable information that may identify a specific entity. For example, entity identification information 204A includes the entity name, "Company A," along with Company A's logo. Similarly, entity identification information 204B includes the entity name, "Company B," along with Company B's logo and trademark. Trade executing machine 140 may evaluate each trade document 120 for entity identification information 204 to associate trade document 120 with a specific entity. Trade executing machine 140 may learn which logos and trademarks are associated with a specific entity to improve the accuracy of identifying specific entities. Furthermore, trade executing machine 140 may identify the patterns involved in placing entity information in specific locations on trade document 120.

In some embodiments, once trade executing machine 140 identifies the entity identification information 204 and/or trade document type 202 from a document, trade executing machine 140 may search stored documents 148 for a previously generated template associated with the identified entity and trade document type 202. Trade executing machine 140 may compare the template to the trade document 120 being analyzed. The template may indicate where specific trade information 122 is located in trade document 120, thus allowing trade executing machine 140 to quickly identify the key information from each trade document 120.

First PO format 200A and second PO format 200B may also each include a PO date 206. PO date 206 may represent the date on which the entity transmitted the PO for processing. PO date 206 may be in any suitable format. For example, PO date 206A is in the format, MM/DD/YY, while PO date 206B is in the format Month DD, YYYY. Trade executing machine 140 may identify and distinguish between multiple different date formats. In some embodiments, trade executing machine 140 may convert each identified date into a common format to facilitate comparisons between related trade documents 120.

PO number 208 may designate a unique group of numbers, symbols, and/or letters with each PO. An entity may use a specific format for its PO numbers, such as a specific number of leading zeros or a specific number of characters. For example, PO number 208A includes four leading zeros in the PO number "0000XYZ123," whereas PO number 208B uses four letters and four numbers in the PO number "ABCD1234." In some embodiments, trade executing machine 140 may identify the contextual patterns that are unique to an entity. For example, trade executing machine 140 may identify trade document type 202A as a PO belonging to Company A. Trade executing machine 140 may look up patterns used by Company A, such as the use of leading zeros in PO numbers. Trade executing machine 140 may then scan first PO format 200A for numbers having four leading zeros. Once a number with four leading zeros is found, trade executing machine 140 may scan the adjacent space around PO number 208A for confirmation that the number is a PO number (e.g., characters such as "PO:" likely indicates that the number is the PO number).

Seller/Supplier identifier 210 may indicate to whom the PO is being sent. For example, first PO format 200A uses the nomenclature "seller" along with the sellers name, address, and phone number. Seller/supplier identifier 210b of second PO format 200B uses the nomenclature "supplier" along with the supplier's name, address, phone number, fax number, and email address. Trade executing machine 140 may identify the location and contents included in each seller/supplier identifier 210.

Shipping information 214 may indicate the location where the requesting entity would like the enterprise to ship the requested goods. In some embodiments, shipping information 214 may also include additional shipping information such as a specific carrier. For example, first PO form 200A uses a table format to indicate shipping information 214A. First PO form 200A includes specific instructions for the terms of the shipment (e.g., shipping method, shipping date). In contrast, second PO form 200B uses a list form to indicate shipping information 214B. Trade executing machine 140 may identify these patterns (i.e., the use of a table and/or list), to identify shipping information 214 in future trade documents 120.

In certain embodiments, trade documents 120 may span multiple pages. For example first PO form 200A is three pages long, while second PO form 100B is one page long. Trade executing machine 140 may scan for page identifier 216 to identify whether trade document 120 is multiple pages, and if so, how many pages are included in trade document 120. In some embodiments, determining the number of pages of trade document 120 is critical when system 100 is processing multiple, different trade documents 120. By identifying page identifier 216, trade executing machine 140 may identify when one trade document 120 ends and the next begins. This may allow trade executing machine 140 to process numerous trade documents 120 without the use of manual separators or cover pages to differentiate each trade document 120.

First PO format 200A and second PO format 200B may each also include goods information 218. Goods information 218 may describe a number of characteristics related to the goods and/or services being requested by the PO. For example, goods information 218 may include a description of the goods, a requested quantity of goods, a unit price requested for each good, and a total for each requested line item (i.e., the quantity of goods times the unit price). The goods description may provide additional information to specifically identify the requested goods, such as a size, color, weight, and/or quality of good. Trade executing machine 140 may identify goods information 218, along with each characteristic included in goods information 218.

As described in FIG. 1, in some embodiments, goods information 218 may be compared to related trade documents 120, such as a transport document to determine whether the supplier sent the correct goods to the entity. For example, Company B may request 100 red widgets from Company XYZ using a purchase order. However, the transport document received by Company B may indicate that 90 blue widgets were sent by Company XYZ. Trade executing machine 140 may evaluate the transport document to determine the related PO #, compare the goods description from the purchase order to the goods description from the transport document and disposition accordingly (e.g., reject the nonconforming shipment, accept only the conforming parts of the shipment).

Certain trade documents 120 may include document code 220 to identify a specific trade document format and/or revision number. For example, second PO format 200B includes document code 220 listed as "PO-100." Trade executing machine 140 may compare the identified document code 220 to a database of known documents codes 220 stored in memory 144. The stored document codes may indicate a number of patterns and the location of trade information 122 for the specific trade document 120 identified by document code 220. In some embodiments, trade executing machine 140 may update a template of the trade document 120 stored in memory 144 to indicate the document format associated with document code 220. In this manner, trade executing machine 140 may utilize document code 220 to quickly identify the type of trade document 120 being processed, the location of trade information 122 in trade document 120, and update templates of the trade document 120 saved in stored documents 148.

In some embodiments, a trade document 120 may include a signature indicator 222 near the end of trade document 120. For example, second PO format 200B includes signature indicator 222 at the bottom of the PO. In some embodiments, trade executing machine 140 may search for signature indicator 222 to determine whether the form has been executed and should be processed, or whether it is unsigned, which may require approval before processing trade document 120. In some embodiments, trade executing machine 140 may search for signature indicator 222 to determine an end of trade document 120.

Although FIGS. 2A and 2B are illustrated using PO forms, any suitable trade document 120 may include multiple versions and formats. To further illustrate embodiments and advantages of the present disclosure, FIGS. 3-4 disclose example methods of processing and evaluating trade documents 120.

Figure 3:
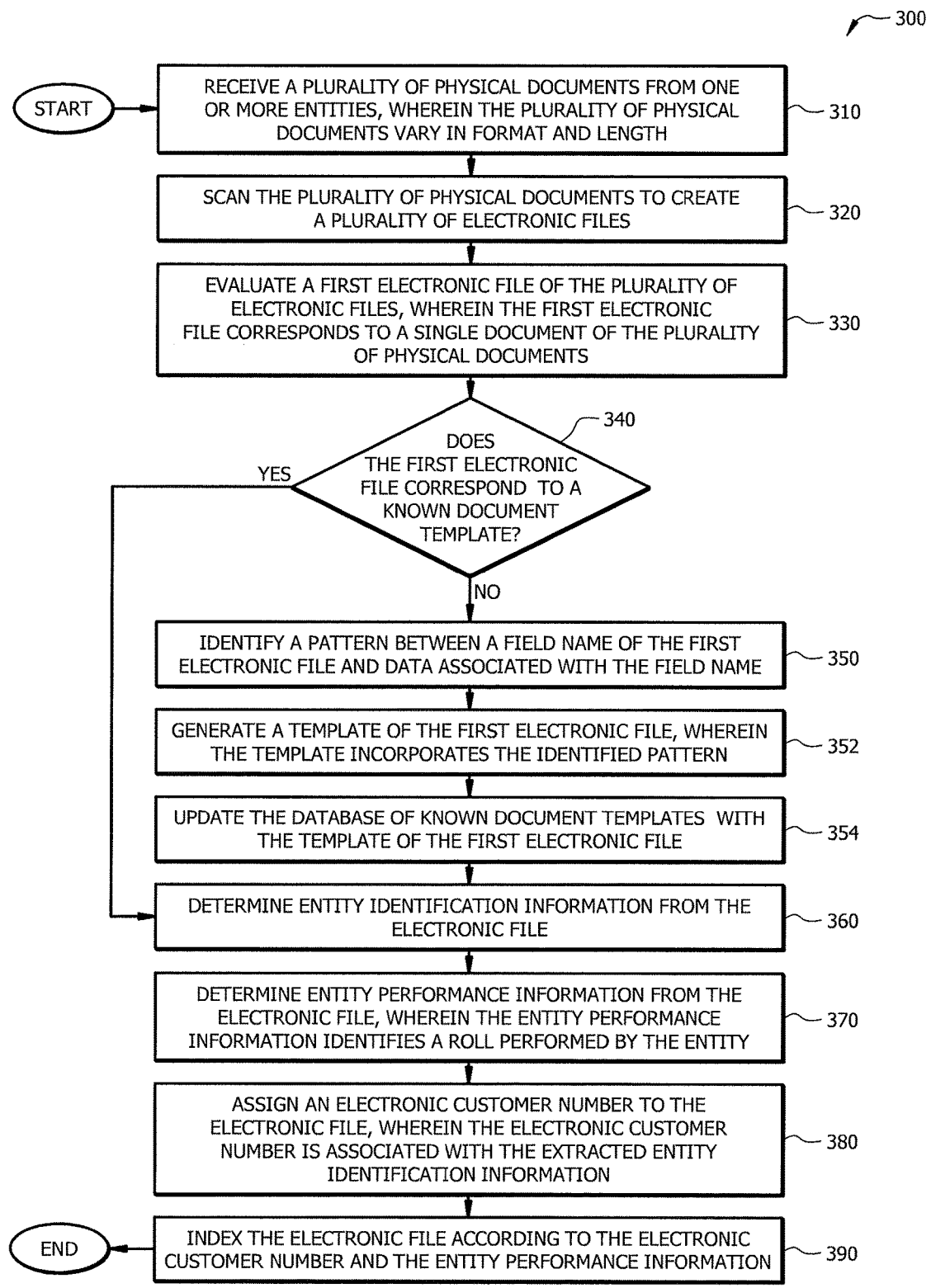
FIG. 3 is a flowchart illustrating an example method of identifying trade documents using trade executing machine.

FIG. 3 is a flowchart illustrating an example method 300 of identifying trade documents 120 using trade executing machine 140. At step 310, system 100 receives a plurality of physical documents 120 from one or more entities. In some embodiments, the physical documents 120 may vary in format and length. For example, an enterprise may provide goods to a number of different clients. Each client may send the enterprise a purchase order requesting a shipment of certain goods from the enterprise. Each client may utilize a different type of purchase order document (as illustrated by FIG. 2). The different types of purchase order documents may vary in length, format, and terminology.

At step 320, upon receiving the plurality of physical documents 120, the enterprise may utilize document intake machine 130 to scan the plurality of physical documents 120, to create electronic files 138 of the physical documents 120. Electronic files 138 may be of any suitable digital format that includes the digital image of trade documents 120. For example, electronic files 138 may be stored as Bitmap, TIFF, PNG, JPEG, GIF, PDF, or any other suitable digital format. In some embodiments, document intake machine 130 may scan in all trade documents 120 and create a single electronic file 138 of the entire batch of trade documents 120. As described in FIG. 1, trade executing machine 140 may then identify each unique trade document 120 within the electronic file 138. In some embodiments, document intake machine 130 may create an individual electronic file 138 for each unique trade document 120.

At step 330, trade executing machine 140 may evaluate a first of the electronic files 138. Trade executing machine 140 may first determine whether electronic file 138 corresponds to a known document type. Thus, at step 340, trade executing machine 140 may check stored documents 148 in memory 144 to determine whether the electronic file 138 corresponds to a known document template. If trade executing machine 140 determines that electronic file 138 is not associated with a known document template stored in memory 144, trade executing machine 140 may determine that trade document 120 is an unstructured document and proceed to step 350. If trade executing machine 140 determines that electronic file 138 does correspond to a known document template stored in memory 144, the sequence may proceed to step 360.

At step 350, trade executing machine 140 may use document data converter program 145 to identify patterns between the fields (e.g., entity name, shipping information, goods information, etc.), of electronic file 138 and data associated with the field. Trade executing machine 140 may utilize any suitable technique for identifying trade information 122 associated with each trade document 120. As explained in FIG. 1, document data converter program 145 may utilize known locational and/or contextual patterns to identify trade information 122 in electronic file 138. For example, document data converter program 145 may assign a coordinate grid to each electronic file 138 to map the location of key field names corresponding to relevant trade information 122. Additionally or alternatively, document data converter program 145 may break each trade document 120 into grids with defined lengths and widths.

At step 352, trade executing machine 140 may generate a template of the electronic file 138 incorporating the identified patterns, and store the template in memory 144. For instance, document data converter program 145 may identify the x-coordinates and y-coordinates of the beginning of trade information 122 in electronic files 138. Trade executing machine 140 may update the template and use the template in the analysis of future trade documents 120 to quickly identify the location of trade information 122. Once trade executing machine 140 has generated the template of electronic file 138, at step 354, trade executing machine 140 may update the database of known document templates with the template of electronic file 138.

Once trade executing machine 140 identifies trade document 120 as either an unstructured document or a document related to a template in stored documents 148, at step 360, trade executing machine 140 may begin analyzing electronic file 138. In some embodiments, trade executing machine 140 may utilize trade analyzer program 146 to determine entity identification information from electronic file 138. Entity identification information may include information such as the name, address, logo, trademarks, or any other identifying information associated with an entity. In some embodiments, trade analyzer program 146 may search field names such as "supplier," "buyer," and "seller," to identify the corresponding entity. At step 370, trade executing machine 140 may determine entity performance information from electronic file 138. The entity performance information may identify a role performed by the identified entity. For example, trade executing machine 140 may determine that electronic file 138 is a purchase order from an entity ordering goods. After identifying the entity information in step 360, trade executing machine 140 may associate the identified entity as a purchaser/buyer.

At step 380, trade executing machine 140 may assign an electronic customer number to electronic file 138 based on the entity identification information determined in step 360. In some embodiments, trade executing machine 140 may first determine whether the entity associated with the electronic file 138 is already stored in customer records 149. For example, the entity may have previously sent a purchase order requesting goods. If trade executing machine 140 determines that the entity already has an electronic customer number stored in customer records 149, trade executing machine 140 may use the preexisting electronic customer number for the new purchase order. In this manner, trade executing machine 140 may keep track of all the transactions and requests associated with a specific entity. If trade executing machine 140 does not identify an electronic customer number in customer records 149, trade executing machine 140 may generate a new number and assign the number to the entity.

At step 390, trade executing machine 140 may index the electronic file 138 in stored documents 148 by the electronic customer number and the entity performance information. Accordingly, trade executing machine 140 may keep track of all documents associated with a specific entity acting in a certain role. For example, in some embodiments, the entity may request goods using a purchase order. Later the entity may provide payment using check or other financial instrument. Trade executing machine 140 may process the financial instrument and categorize the entity as a payor. Thus, in some embodiments, an entity may perform multiple roles in a single trade.

Various embodiments may perform some, all, or none of the steps of method 300 described above. Furthermore, steps of method 300 may be performed in different orders. For example, in some embodiments, upon receiving electronic file 138, trade executing machine 140 may first determine the entity identification information 204 from the electronic file 138. Upon determining entity identification information 204, trade executing machine 140 may search customer records 149 to determine whether documents from the entity have previously been evaluated. This may allow trade executing machine 140 to quickly identify previous templates associated with electronic file 138. In some embodiments, trade executing machine 140 may evaluate electronic document 138 for document code 220, to ascertain whether the electronic file 138 is associated with a specific document template stored in memory 144.

Figure 4:
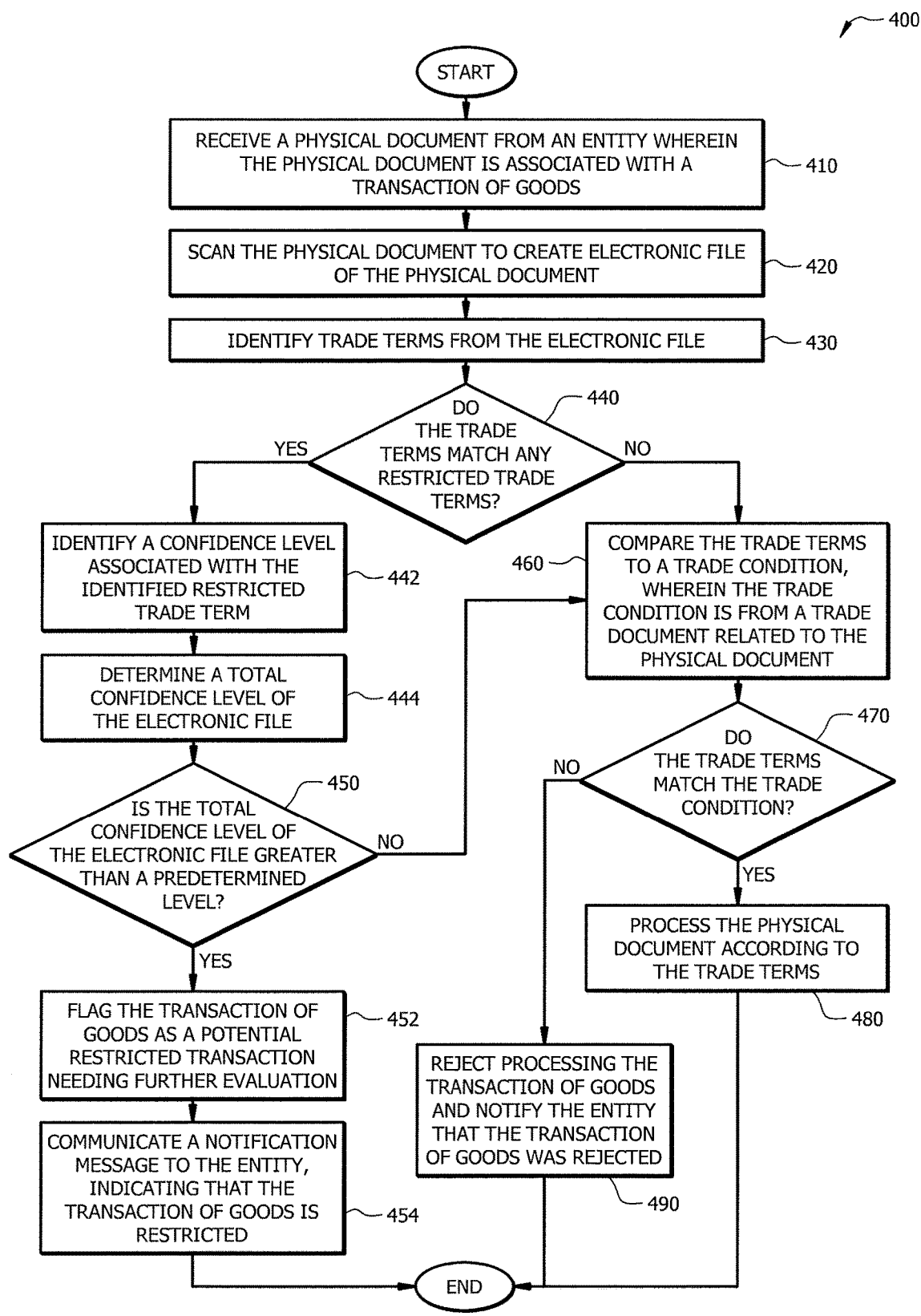
FIG. 4 is a flowchart illustrating an example method of evaluating and processing trade documents using trade executing machine.

Once trade document 120 has been identified by trade executing machine 140, trade information 122 may be analyzed to determine how to process the trade document 120. FIG. 4 is a flowchart illustrating an example method 400 of evaluating and processing trade documents 120 using trade executing machine 140. At step 410, system 100 may receive a physical (i.e., hardcopy) trade document 120 from an entity. In some embodiments, the physical document is associated with a transaction of goods, such as a purchase order, invoice, transport document, letter of credit, or any other suitable transaction document. At step 420, document intake machine 130 may scan the physical document using scanner 134 and extractor 136 to create electronic file 138. In certain embodiments, trade executing machine 140 then receives electronic file 138 for processing.

At step 430, trade executing machine 140 may use information analyzer program 147 (and/or document data converter program 145 and trade analyzer program 146) to identify trade terms from electronic file 138. Depending on the type of trade document 120 (i.e., purchase order, invoice, etc.), trade terms may include a number field names and data. For example, invoice orders and purchase orders may include a related purchase/invoice order number, a shipment date, tracking number, order terms, product/service description, product quantities, unit pricing, costs, shipping information (e.g., delivery address and supplier name/address), and the purchasing entity. A transport document may include information such as a carrier name, related purchase order number, supplier/shipper, transport document number, shipper/carrier signatures, customs clearance indicia (e.g., stamps, signatures, etc.), product identifiers (quantity, weight, etc.) and insurance information. A letter of credit may include trade information 122 such as the name of an issuing financial institution, a credit amount or ceiling, the entity receiving the credit, and an expiration of the letter of credit.

At step 440, trade executing machine 140 may compare the identified trade terms to a database of restricted trade terms stored in memory 144. Restricted trade terms may include a number of countries, entities, goods, and/or services that are restricted, for instance by the Office of Foreign Assets Control (OFAC). For example, information analyzer program 147 may determine whether an entity listed on trade document 120 is listed as a restricted entity, indicating that the enterprise may not conduct trades with that entity. If trade executing machine 140 identifies a trade term from electronic file 138 that matches a restricted trade term then the sequence may proceed to step 442. If trade executing machine 140 does not identify a restricted trade term in electronic file 138, then the sequence may proceed to step 460.

At step 442, trade executing machine 140 may identify a confidence level of the capture quality associated with the identified restricted trade term. In some embodiments, information analyzer program 147 may maintain a database of flagged/restricted terms in stored documents 148 along with an indication (i.e., confidence) of the likelihood that the term is actually associated with a restricted trade. At step 444, information analyzer program 147 may identify each trade term identified as a restricted trade term and determine a total confidence level associated with electronic file 138. Information analyzer program 147 may identify multiple terms that are part of trade information 122 associated with trade document 120. For example, a company name may be associated with a low confidence level that the company is on a restricted trade list (e.g., the trade document 120 lists a common company name). However, when combined with the shipping address of the company, the confidence level may increase over a predetermined threshold, causing information analyzer program 147 to flag the trade document 120. In this manner, trade executing machine 140 may accurately identify trade documents 120 associated with potentially restricted trades.

Trade executing machine 140 may use any suitable level/threshold quality to determine whether trade document 120 is part of a restricted trade. For example, in some embodiments, any term identified as a restricted trade term may flag the transaction as a potentially restricted transaction (i.e., exceeding a 0% threshold). In some embodiments, trade executing machine 140 may set the character recognition threshold percentage at any suitable level (e.g., 10%, 25%, 33%, 50%, etc.). In certain embodiments, the capture quality of trade terms may be associated with a ranking in addition to, or instead of a percentage. For example, capture quality may be ranked as low risk, medium risk, or high risk. Based on the number of low, medium, and/or high risk quality in trade document 120, trade executing machine 140 may determine that the confidence level exceeds a threshold level. As an example, and not by way of limitation, trade executing machine 140 may indicate that trade document 120 is over a predetermined level if trade document 120 has any high risk restricted terms, 2 or more medium restricted terms, or 4 or more low risk restricted terms. As another example, in some embodiments, certain field names or trade terms may carry a heavier weight when determining the confidence level of trade document 120. For example, a description of goods may be weighted heavier than an email address of an entity. Trade executing machine 140 may use any suitable indicator or system for determining the likelihood that a trade document 120 is associated with a restricted transaction.

If trade executing machine 140 determines that the total confidence level of electronic file 138 is greater than the predetermined level then the sequence may proceed to step 452. If the confidence level is below the predetermined level then the sequence may proceed to step 460.

At step 452, trade executing machine 140 determines that the confidence level associated with trade document 120 exceeds a threshold level indicating the trade document 120 may be associated with a restricted transaction. At step 452, trade executing machine 140 flags the transaction of goods as a potential restricted transaction needing further evaluation. At step 454, trade executing machine 140 may communicate a notification message to the entity, indicating that the transaction of goods is restricted and was rejected and/or is flagged for further evaluation.

Upon flagging and determining that trade document 120 is associated with a restricted trade, in some embodiments, trade executing machine 140 may take additional steps to prevent the restricted trade. For example, trade executing machine 140 may terminate the underlying trade associated with flagged trade document 120 by cancelling the shipment of goods from the enterprise. In some embodiments, trade executing machine 140 may notify a governmental authority of the trade document 120. Accordingly, an enterprise may use system 100 to prevent participating in trades with sanctioned entities and/or countries.

If electronic file 138 does not include any restricted trade terms, or the identified restricted trade terms do not exceed the predetermined level, the sequence may proceed to step 460. At step 460, trade executing machine 140 may compare the trade terms to a trade condition. In some embodiments, the trade condition may come from a trade document related to the physical document scanned by document intake machine 130. For example, trade executing machine 140 may determine whether an entity is fulfilling a contractual obligation to order a quantity of goods. In this example, trade document 120 (i.e., the physical document) may be a purchase order from the entity. The trade terms may correspond to a requested quantity of goods identified in the purchase order. Trade executing machine 140 may identify the instrument (e.g., a contract or other document) related to the purchase order and identify the quantity of goods the entity is obligated to purchase.

At step 470, trade executing machine 140 may compare the trade term to the trade condition. Continuing the above example, trade executing machine 140 may compare the requested quantity of goods to the quantity of goods obligation to determine if the quantities match, are within a predetermined tolerance (e.g., 5%, 10%, 25%), and/or if the requested quantity exceeds the obligation (i.e., the obligation is a minimum quantity the entity must purchase). If the terms comply with the conditions, the sequence may proceed to step 480 wherein the transaction of goods is processed according to the trade terms indicated by the physical document. If the terms do not match or are outside the allowed tolerance, the sequence may proceed to step 490 wherein trade executing machine 140 may reject processing the transaction of goods and notify the entity that the transaction of goods was rejected. In this manner, trade executing machine 140 may efficiently compare trade documents 120 to determine whether an entity is meeting the terms of the instrument agreement.

Although described using purchase orders, invoices, and instruments, any suitable documents may be used as related trade documents 120. For example, related trade documents 120 may be a transport document, a letter of credit, or any other suitable related document.

Various embodiments may perform some, all, or none of the steps of method 300 described above. For example, in addition to, or alternatively, method 300 may identify shipment information from trade documents 120. Trade executing machine 140 may compare trade terms such as shipment dates, travel routes, shipment methods, or any other suitable shipment term used to transact goods.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for executing terms of physical trade documents, comprising:
  a document intake machine comprising a document scanner and a data extractor, the document intake machine configured to receive first and second physical trade documents from an entity, wherein the first and second physical trade documents are associated with a purchase of first and second goods, the document intake machine further configured to:
    scan, using the document scanner, the first physical trade document to create a first electronic file of the first physical trade document;
    scan, using the document scanner, the second physical trade document to create a second electronic file of the second physical trade document;
    identify, using the data extractor, first trade terms from the first electronic file, wherein the first trade terms comprise one or more of: a quantity of the first goods, a unit price of the first goods, and a total price of the first goods;
    identify, using the data extractor, second trade terms from the second electronic file, wherein the second trade terms comprise one or more of: a quantity of the second goods, a unit price of the second goods, and a total price of the second goods;
  a trade executing machine configured to receive the first and second trade terms from the document intake machine, the trade executing machine further configured to:
    identify a location of the first trade terms in the first physical trade document;
    create a first template file of the first physical trade document using the location of the first trade terms;
    identify a location of the second trade terms in the second physical trade document;
    compare the location of the second trade terms with the first template file to determine that the second trade document to determine that the second physical trade document is from a different supplier than the first physical trade document;
    in response to determining that the second physical trade document is from a different supplier than the first physical trade document, create a second template file of the second physical trade document using the location of the second trade terms;
    compare the first trade terms to a first trade condition, wherein the first trade condition is identified from a document related to the first physical trade document, the first physical trade document is an invoice and the document related to the physical trade document is a purchase order;
    compare the second trade terms to a second trade condition, wherein the second trade condition is identified from a document related to the second physical trade document, the second physical trade document is a purchase order and the document related to the second physical trade document is a letter of credit;
    identify, as the first trade condition, a requested cost of the goods from the purchase order;
    identify, as a trade term, the billed cost of goods from the invoice;
    compare the billed cost of goods to the requested cost of the goods;
    process the invoice in response to the billed cost of goods matching the requested cost of the goods;
    identify, as the second trade condition, a credit limit associated with the letter of credit;
    identify, as a trade term, a total cost of goods from the purchase order; and
    if the total cost exceeds the credit limit:
      reject processing of the purchase order; and
      communicate, to the entity, a notification message comprising an indication that the purchase order was not processed according to the trade terms due to the total cost exceeding the credit limit;
    if the first trade terms match the first trade condition:
      process the first physical trade document according to the first trade terms; and communicate, to the entity, a notification message indicating that the first physical trade document was processed according to the first trade terms; and if the first trade terms do not match the first trade condition:
reject processing of the first physical trade document;
identify discrepancies between the first trade terms and the first trade condition; and
communicate, to the entity, a notification message comprising:
an indication that the first physical trade document was not processed according to the first trade terms; and
a description of the discrepancies between the first trade terms and the first trade condition.

2. The system of claim 1, wherein the first trade terms match the first trade condition if the first trade terms are within a predetermined tolerance of the first trade condition.

3. The system of claim 1, wherein:
the document intake machine is further configured to receive a third physical trade document from the entity, the third physical trade document is a purchase order and a document related to the third physical trade document is an instrument with the entity;
the trade executing machine is further configured to:
identify, as a third trade condition, a quantity of goods obligation from the instrument;
identify, as a third trade term, a requested quantity of goods from the purchase order;
compare the requested quantity of goods to the quantity of goods obligation;
if the requested quantity of goods is within a predetermined percentage of the quantity of goods obligation, process the purchase order according to the requested quantity of goods; and
if the requested quantity of goods is not within the predetermined percentage of the quantity of goods obligation, reject the purchase order.

4. A method for executing terms of physical trade documents, comprising:
receiving, using an interface, first and second physical trade documents from an entity, wherein the first and second physical trade documents are associated with a purchase of first and second goods;
scanning, using a scanner communicatively coupled to the interface, the first physical trade document to create a first electronic file of the first physical trade document;
scanning, using the document scanner, the second physical trade document to create a second electronic file of the second physical trade document;
identifying, using a data extractor communicatively coupled to the scanner and interface, first trade terms from the first electronic file, wherein the first trade terms comprise one or more of: a quantity of the first goods, a unit price of the first goods, and a total price of the first goods;
identifying, using the data extractor, second trade terms from the second electronic file, wherein the second trade terms comprise one or more of: a quantity of the second goods, a unit price of the second goods, and a total price of the second goods;
identifying a location of the first trade terms in the first physical trade document;
creating a first template file of the first physical trade document using the location of the first trade terms;

identifying a location of the second trade terms in the second physical trade document;
comparing the location of the second trade terms with the first template file to determine that the second trade document to determine that the second physical trade document is from a different supplier than the first physical trade document;
in response to determining that the second physical trade document is from a different supplier than the first physical trade document, creating a second template file of the second physical trade document using the location of the second trade terms;
comparing, using a processor communicatively coupled to the extractor, scanner, and interface, the first trade terms to a first trade condition, wherein the first trade condition is identified from a document related to the first physical trade document, the first physical trade document is an invoice and the document related to the physical trade document is a purchase order;
comparing the second trade terms to a second trade condition, wherein the second trade condition is identified from a document related to the second physical trade document, the second physical trade document is a purchase order and the document related to the second physical trade document is a letter of credit;
identifying, as the first trade condition, a requested cost of the goods from the purchase order;
identifying, as a trade term, the billed cost of goods from the invoice;
comparing the billed cost of goods to the requested cost of the goods;
processing the invoice in response to the billed cost of goods matching the requested cost of the goods;
identifying, as the second trade condition, a credit limit associated with the letter of credit;
identifying, as a trade term, a total cost of goods from the purchase order; and
if the total cost exceeds the credit limit:
rejecting processing of the purchase order; and
communicating, to the entity, a notification message comprising an indication that the purchase order was not processed according to the trade terms due to the total cost exceeding the credit limit;
if the first trade terms match the first trade condition:
processing the first physical trade document according to the first trade terms; and
communicating, to the entity, a notification message indicating that the first physical trade document was processed according to the first trade terms; and
if the first trade terms do not match the first trade condition:
rejecting processing of the first physical trade document;
identifying discrepancies between the first trade terms and the first trade condition; and
communicate, to the entity, a notification message comprising:
an indication that the first physical trade document was not processed according to the first trade terms; and
a description of the discrepancies between the first trade terms and the first trade condition.

5. The method of claim 4, wherein the first trade terms match the first trade condition if the first trade terms are within a predetermined tolerance of the first trade condition.

6. The method of claim 4, further comprising:
receiving a third physical trade document from the entity, wherein the third physical trade document is a purchase order and a document related to the third physical trade document is an instrument with the entity;
identifying, as a third trade condition, a quantity of goods obligation from the instrument;
identifying, as a third trade term, a requested quantity of goods from the purchase order;
comparing the requested quantity of goods to the quantity of goods obligation;
if the requested quantity of goods is within a predetermined percentage of the quantity of goods obligation, processing the purchase order according to the requested quantity of goods; and
if the requested quantity of goods is not within the predetermined percentage of the quantity of goods obligation, rejecting the purchase order.

7. A non-transitory computer readable medium comprising logic, the logic operable, when executed by a processor, to:
receive first and second physical trade documents from an entity, wherein the first and second physical trade documents are associated with a purchase of first and second goods;
scan the first physical trade document to create a first electronic file of the first physical trade document;
scan the second physical trade document to create a second electronic file of the second physical trade document;
identify first trade terms from the first electronic file, wherein the first trade terms comprises one or more of: a quantity of the first goods, a unit price of the first goods, and a total price of the first goods;
identify second trade terms from the second electronic file, wherein the second trade terms comprise one or more of: a quantity of the second goods, a unit price of the second goods, and a total price of the second goods;
identify a location of the first trade terms in the first physical trade document;
create a first template file of the first physical trade document using the location of the first trade terms;
identify a location of the second trade terms in the second physical trade document;
compare the location of the second trade terms with the first template file to determine that the second trade document to determine that the second physical trade document is from a different supplier than the first physical trade document;
in response to determining that the second physical trade document is from a different supplier than the first physical trade document, create a second template file of the second physical trade document using the location of the second trade terms;
compare the first trade terms to a trade condition, wherein the first trade condition is identified from a document related to the first physical trade document, the first physical trade document is an invoice and the document related to the physical trade document is a purchase order;
compare the second trade terms to a second trade condition, wherein the second trade condition is identified from a document related to the second physical trade document, the second physical trade document is a purchase order and the document related to the second physical trade document is a letter of credit;
identify, as the first trade condition, a requested cost of the goods from the purchase order;
identify, as a trade term, the billed cost of goods from the invoice;
compare the billed cost of goods to the requested cost of the goods;
process the invoice in response to the billed cost of goods matching the requested cost of the goods;
identify, as the second trade condition, a credit limit associated with the letter of credit;
identify, as a trade term, a total cost of goods from the purchase order; and
if the total cost exceeds the credit limit:
reject processing of the purchase order; and
communicate, to the entity, a notification message comprising an indication that the purchase order was not processed according to the trade terms due to the total cost exceeding the credit limit;
if the first trade terms match the first trade condition:
process the first physical trade document according to the first trade terms; and
communicate, to the entity, a notification message indicating that the first physical trade document was processed according to the first trade terms; and
if the first trade terms do not match the first trade condition:
reject processing of the first physical trade document;
identify discrepancies between the first trade terms and the first trade condition; and
communicate, to the entity, a notification message comprising:
an indication that the first physical trade document was not processed according to the first trade terms; and
a description of the discrepancies between the first trade terms and the first trade condition.

8. The non-transitory medium of claim 7, wherein the first trade terms match the first trade condition if the first trade terms are within a predetermined tolerance of the first trade condition.

9. The non-transitory medium of claim 7, wherein the logic is further operable when executed to:
receive a third physical trade document from the entity, the third physical trade document is a purchase order and a document related to the third physical trade document is an instrument with the entity:
identify, as a third trade condition, a quantity of goods obligation from the instrument;
identify, as a third trade term, a requested quantity of goods from the purchase order;
compare the requested quantity of goods to the quantity of goods obligation;
if the requested quantity of goods is within a predetermined percentage of the quantity of goods obligation, process the purchase order according to the requested quantity of goods; and
if the requested quantity of goods is not within the predetermined percentage of the quantity of goods obligation, reject the purchase order.

* * * * *